United States Patent [19]

Protz

[11] Patent Number: 4,666,298

[45] Date of Patent: May 19, 1987

[54] SENSING DEVICE FOR ASCERTAINING IMAGING ERRORS

[75] Inventor: Rudolf Protz, Glonn, Fed. Rep. of Germany

[73] Assignee: Messerschmitt-Boelkow-Blohm GmbH, Munich, Fed. Rep. of Germany

[21] Appl. No.: 722,128

[22] Filed: Apr. 10, 1985

[30] Foreign Application Priority Data

Apr. 10, 1984 [DE] Fed. Rep. of Germany ....... 3413420

[51] Int. Cl.$^4$ .............................................. G01J 1/00
[52] U.S. Cl. ..................................... 356/121; 356/354
[58] Field of Search .................... 250/201 R; 356/121, 356/354

[56] References Cited

U.S. PATENT DOCUMENTS

| | | | |
|---|---|---|---|
| 4,141,652 | 2/1979 | Feinleib | 356/121 |
| 4,309,602 | 1/1982 | Gonsalves et al. | 250/201 |
| 4,508,963 | 4/1985 | Wilwerding et al. | 250/578 X |
| 4,518,854 | 5/1985 | Hutchin | 356/354 X |

Primary Examiner—Eugene R. LaRoche
Assistant Examiner—James C. Lee
Attorney, Agent, or Firm—Ralf H. Siegemund

[57] ABSTRACT

A sensing device for use in an adaptive optic system, being provided with an optical phase correcting element, is specifically provided for ascertaining errors in the image of an object as imaged by the adaptive optical system as follows; rod lenses subdivide the entrance pupil of the aperture into a plurality of juxtaposed subapertures having a diameter corresponding to Fried's coherence diameter to obtain a respective plurality of individual images of the object; a high resolution optical-electrical detector array is positioned to receive the plurality of juxtaposed individual images; the relative disposition of the subimages is ascertained under utilization of a correlation computer.

4 Claims, 1 Drawing Figure

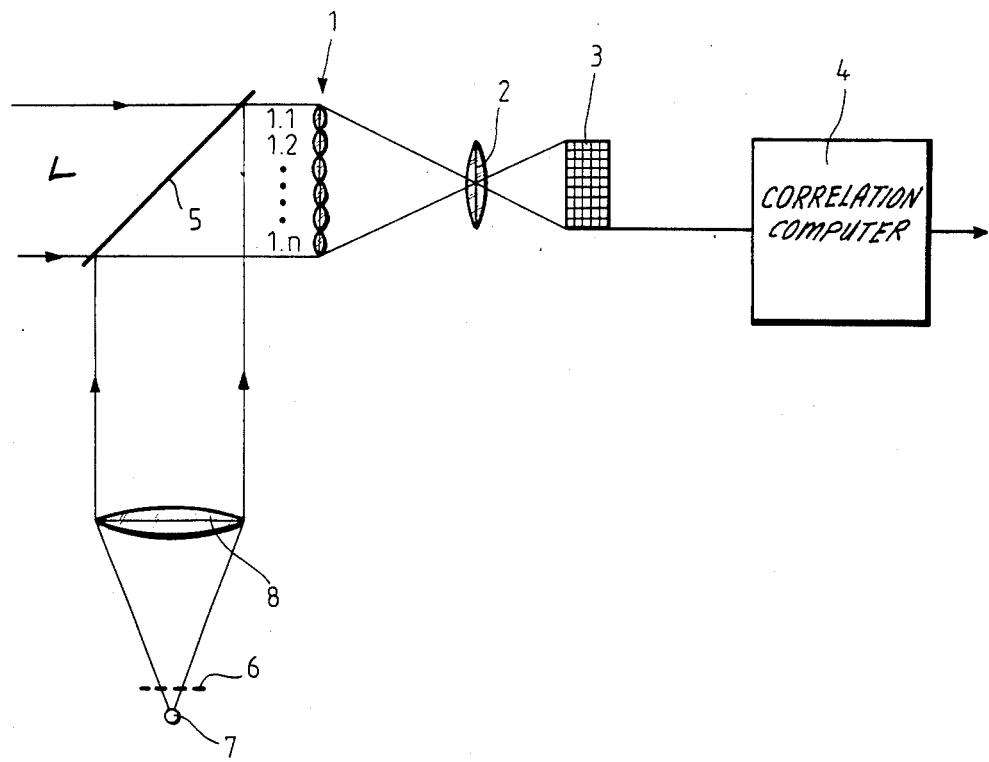

SENSING DEVICE FOR ASCERTAINING IMAGING ERRORS

BACKGROUND OF THE INVENTION

The present invention relates to a sensing device for and to be used in association with an adaptive optical system and being provided for ascertaining errors in the image of an imaged object, the optical system is assumed to include an element providing for optical phase corrections; moreover it is assumed that the optical system includes an entrance pupil subdivided into several subapertures for purposes of providing several individual images of the object whereby the individual subapertures are associated with optic-electrical detectors.

A device of the type to which the invention pertains and including generally the type mentioned above is described for example in U.S. Pat. No. 4,141,652. This kind of sensing device is also known as Hartmann sensor. A sensor of this type is provided for recognizing disturbing interferences in planar wavefronts or spherically curved wavefronts e.g. as emitted by a laser or by a point like light source as it occurs during propagation through the atmosphere. The known sensor operates on the basic principle that the aperture of the adaptive optic is to be subdivided into subapertures and their size is proportioned so that the respective optical interferences occuring therein become noticeable only as tilting of the respective optical axis. Herein the laser beam is for ex. acquired and ascertained by such a subaperture is focused upon the respectively associated quadrant detector and deviations of the image light spot from the optical axis as determined by the quadrant detector as an initial condition is measured. This then represents a kind of absolute measurement as far as tilting of the beam axis is concerned, such tilting being individually associated with the respective subaperture. It was found however that this procedure requires a very high expenditure in optical and mechanical accuracy and is, therefore, applicable only to the special cases of planar or spherical wavefronts as they are respectively produced e.g. by a laser beam or by a star.

DESCRIPTION OF THE INVENTION

It is an object of the present invention to provide a new and improved sensing device of the type mentioned above being applicable to areal structured images; it is a particular object of the present invention to provide a new and improved sensing device for and to be used in an adaptive optic being provided with an optical phase correction element, the device serve for ascertaining image errors in an image object; it is a feature of the present invention to improve the subdivision of the respective entrance pupil into subapertures for purposes of generating several individual images of the object.

In accordance with the preferred embodiment of the present invention it is suggested to associate each of the subapertures with a portion of a high resolution optic electric detector array upon which the individual images are juxtaposed and that their relative geometric position is ascertained separately. The association is preferably carried out by a plurality of juxtaposed rod lenses; each subaperature should have a diameter that corresponds to Fried's coherency diameter in the atmosphere. A measuring raster may be superimposed optically.

Contrary to the known Hartmann wavefront sensor the sensor in accordance with the invention acquires each individual image as being associated with subaperture in a high resolution manner, and the relative geometric position of these images is then calculated. This means that the sensor is no longer limited to narrow beams or ray bundles or pointlike light sources.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

the FIGURE illustates somewhat schematically a sensor in accordance with the preferred embodiment of the present invention for practicing the best mode thereof.

Proceeding now to the detailed description of the drawings a light beam L enters the system, in the drawings from the left and originating from an object to be imaged. Moreover, it is assumed that this beam of light L has traversed a turbulent atmosphere. Still furthermore an imaging optical system such as a telescope with an adaptive optic (not shown) is provided in order to obtain an image.

A characteristic feature and quantity for the disturbing interference by the atmospheric turbulence with the phasefront of an electromagnetic wave is the so called Fried coherence diameter $r_0$ in the atmosphere. This value represents the diameter in accordance with which the phasefront deviates from the ideal wavefront in a quadratic averaging sense and by one rad. The entrance aperture of the astronomical equipment is generally larger than this so called Fried coherence diameter $r_0$ so that interferences of the wavefronts are in fact superimposed and that in turn leads to image errors. Correction of these image errors is carried out usually in a manner known per se by means of an adaptive optical system which is not illustrated in detail but is described e.g. by John W. Hardy, "Active Optics: A new technology for the control of light", Proceedings of the IEEE, vol. 66, No. 6 of June 1978.

For recognizing image errors and for controlling the adaptive object it is now proposed to establish a sensing system which includes a lens array 1 subdividing the entrance pupil and aperture into a plurality of subapertures. This lens array 1 can be deemed to be composed of a plurality of immediately juxtaposed individual lenses 1.1, 1.2 1.n and establishes a number of n individual images of the object. The number n of the lenses 1.1–1.n is selected so that each of the lenses collects the light of just one subaperture of the optical system under the consideration that the diameter of that subaperture corresponds to the Fried coherence diameter $r_0$ which is in the order of 0.5–2.5 mm.

The lens array 1 can e.g. be established by a matrix like concatenation of so called rod lenses or Selfoc lenses. The images produced by the lenses of this array are imaged by means of an objective 2 upon a self scanning detector array 3 being e.g. of the charge coupled device (CCD) variety. The objective lens 2 serves for geometrically matching the individual images within the assembly of subapertures to the detector area. The detector array is selected so that each of the lenses 1.1-1.n provides an image upon a particular area covering about 10 by 10 detector elements of the array 3.

The relative geometric disposition of these images is a measure for the angular deviation which the subapertures experience on acount of the atmospheric disturbances. This angular deviation is in fact acquired by a correlation computer 4. The correlation computer 4 receives the outputs of the detector array 3 and processes the angular deviation from the electronic signal frequency by means of which the array is scanned. A correlation calculator and the respective calculating methods and algorithms have been proposed e.g. by John Eldon in "Correlation - - - A powerful technique for digital signal processing", TRW LSI products of December 1980.

The computer 4 determines the various deviations of the subimages from a position which corresponds to a central position vis-a-vis the respective optical axes of the lenses 1.1, 1.2, etc. These deviations are then used for controlling an optical phase shift device within the not illustrated adaptive optical system so as to zero the respective deviations on the basis of automatic feedback control.

The sensor optic may provide adjusting errors which should be compensated electronically. For this a semi-transparent mirror 5 is provided upstream of the lens array 1 and a line grid 6 of the kind of the so called Ronchi grid is provided also and illuminated by means of a light source 7. This grid then is inserted optically through a collimator 8 into the principal beam L. The correlation of the grid image as originating with the grid 6 and serving as a measuring raster will be ascertained by the correlation computer 4 and is used as the desired value for the correlation computation and to be used in the above mentioned feedback control for the adaptive optic.

The invention is not limited to the embodiments described above, but all changes and modifications thereof, not constituting departures from the spirit and scope of the invention, are intended to be included.

I claim:

1. Sensing device for use in association with an adaptive optical system having an entrance pupil and being provided with an optical phase correcting element, the sensing device being provided for ascertaining errors in the image of an object as imaged by said adaptive optical system, the combination comprising:

means for subdividing the entrance pupil of the aperture into a plurality of juxtaposed subapertures so as to obtain a respective plurality of individual subimages of the object respectively corresponding to the subapertures;

a high resolution optical-electrical detector array positioned with respect to said means for dividing, so as to receive a plurality of juxtaposed individual subimages; and means connected to the detector array for ascertaining the relative disposition of the subimages under utilization of a correlation computer.

2. Sensing device as in claim 1 wherein the effective diameter of a subaperture corresponds to the Fried coherence diameter in the atmosphere.

3. Sensor as in claim 1 wherein said means for providing the subapertures is established by a plurality of juxtaposed rod lenses.

4. Sensing device as in claim 1 and including a semitransparent mirror inserted optically upstream from said means for providing subapertures; and means for introducing into the light ray path for the detector array and through said semitransparent mirror an illuminated measuring raster.

* * * * *